(12) United States Patent
Shinomoto et al.

(10) Patent No.: US 8,700,700 B2
(45) Date of Patent: Apr. 15, 2014

(54) SCREEN SHOT DISPLAY CONTROL APPARATUS, SCREEN SHOT DISPLAY CONTROL METHOD, INTEGRATED CIRCUIT FOR SCREEN SHOT DISPLAY CONTROL, AND SERVER APPARATUS

(75) Inventors: Yuki Shinomoto, Osaka (JP); Hidehiko Shin, Osaka (JP)

(73) Assignee: Panasonic Corporation, Osaka (JP)

( * ) Notice: Subject to any disclaimer, the term of this patent is extended or adjusted under 35 U.S.C. 154(b) by 46 days.

(21) Appl. No.: 13/377,218

(22) PCT Filed: Dec. 10, 2010

(86) PCT No.: PCT/JP2010/007187
§ 371 (c)(1),
(2), (4) Date: Dec. 9, 2011

(87) PCT Pub. No.: WO2011/128957
PCT Pub. Date: Oct. 20, 2011

(65) Prior Publication Data
US 2012/0084354 A1  Apr. 5, 2012

(30) Foreign Application Priority Data

Apr. 13, 2010 (JP) .................................. 2010-091983

(51) Int. Cl.
*G06F 15/16* (2006.01)
*H04L 29/08* (2006.01)

(52) U.S. Cl.
CPC ................................ *H04L 29/08072* (2013.01)
USPC ............................. 709/203; 715/700; 715/744

(58) Field of Classification Search
USPC ......................................................... 725/60
See application file for complete search history.

(56) References Cited

U.S. PATENT DOCUMENTS 6,173,445 B1 * 1/2001 Robins et al. .................. 717/173
6,343,313 B1 * 1/2002 Salesky et al. ................ 709/204
7,969,413 B2 * 6/2011 Aonuma et al. .............. 345/156
(Continued)

FOREIGN PATENT DOCUMENTS

JP          7-44155      2/1995
JP       2009-43059     2/2009

OTHER PUBLICATIONS

International Search Report issued Jan. 18, 2011 in corresponding International Application No. PCT/JP2010/007187.

*Primary Examiner* — Eleni Shiferaw
*Assistant Examiner* — Gregory M Elmore
(74) *Attorney, Agent, or Firm* — Wenderoth, Lind & Ponack, L.L.P.

(57) ABSTRACT

A display control technique that allows a latest screen shot to be displayed on a client apparatus regardless of a file update state in a server apparatus, in a network system that realizes a remote UI, is provided. When a file 105 on a server apparatus 100 has been updated during a period from a time of last end of an application to the current time, a first screen shot management section 102 transmits a screen shot 106 generated by the server apparatus 100, to a client apparatus 110. A display control section 116 displays the received screen shot 106 on a display screen when receiving the screen shot 106 from the server apparatus 100; and displays a screen shot 117 that is generated by the client apparatus 110 and stored in a second screen shot management section 114, on the display screen in the case other than the above.

10 Claims, 12 Drawing Sheets

(56) References Cited

U.S. PATENT DOCUMENTS

2007/0043529 A1* 2/2007 Johnson ................ 702/150
2008/0201405 A1* 8/2008 Duursma et al. .............. 709/202
2009/0237728 A1* 9/2009 Yamamoto ................... 358/1.15
2010/0146558 A1* 6/2010 Pandey ........................... 725/60

* cited by examiner

FIG. 2
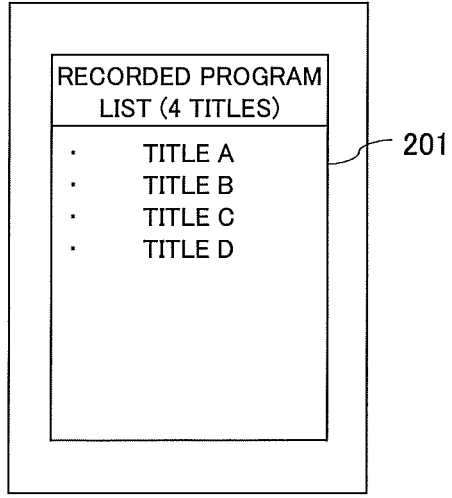
FIG. 3A  FILE FORMAT OF FILE REQUIRED FOR
EXECUTION OF AN APPLICATION
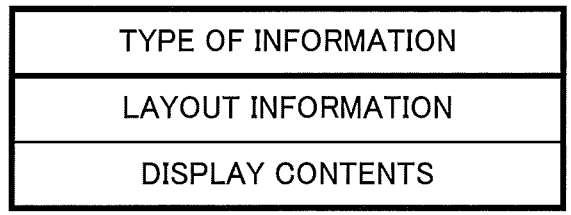
FIG. 3B  FILE FORMAT OF A SCREEN SHOT
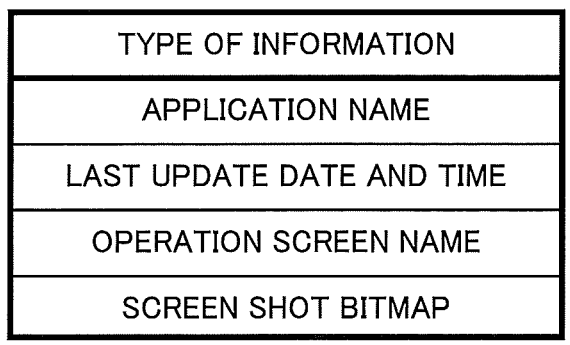

FIG. 13
(a) LATEST SCREEN SHOT
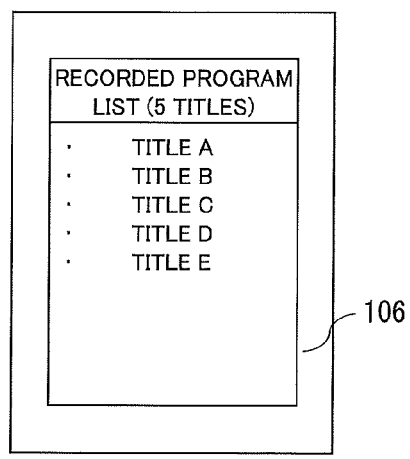
(b) SCREEN SHOT TRASMITTED AT THE LAST TIME
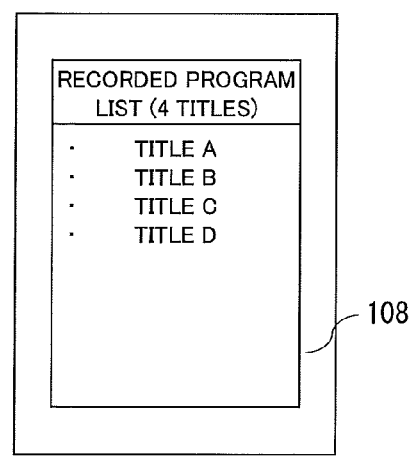
(c) DIFFERENCE DATA
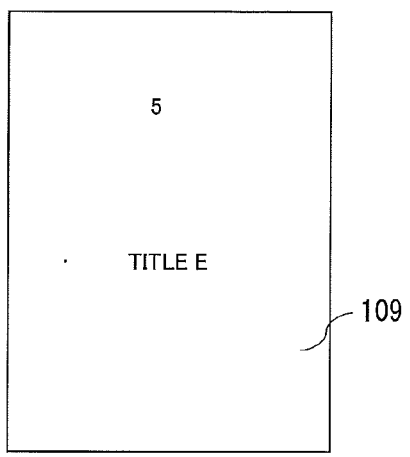

SCREEN SHOT DISPLAY CONTROL APPARATUS, SCREEN SHOT DISPLAY CONTROL METHOD, INTEGRATED CIRCUIT FOR SCREEN SHOT DISPLAY CONTROL, AND SERVER APPARATUS

TECHNICAL FIELD

The present invention relates to a display control technique of controlling a display of a screen shot in a client apparatus that executes an application provided from a server apparatus and remotely operates the server apparatus.

BACKGROUND ART

Conventionally, a remote user interface (UI) is known as a technique of providing an interface to an apparatus on an operating side when remotely controlling an apparatus connected thereto via a network.

The remote UI is realized by a server apparatus (a remotely controlled apparatus) that transmits a file required for execution of an application and a client apparatus that is connected to the server apparatus via a network and executes the application by using the file received from the server apparatus. Specifically, the client apparatus holds the IP address of the server apparatus and the name of the application that is to be activated. When receiving an instruction to activate the application, the client apparatus requests the server apparatus to transmit the file required for execution of the application (a definition file of a UI or display contents). When receiving the file from the server apparatus, the client apparatus executes the application by using the received file, and displays an operation screen (UI).

As a technique other than the above remote UI, a screen shot technique is known. The screen shot technique is a technique in which a screen shot that is a display image after completion of activation of an application is displayed during a period from start of an activation process of the application to the completion thereof, in order to make the activation speed of the application appear faster. Here, the screen shot is obtained by storing, as a bitmap, a rendered content that is written by the application into a frame buffer (a memory for temporarily storing raster data of an image to be displayed on a display).

Specifically, immediately after the start of the activation of the application, previously prepared data of a screen shot is written into the frame buffer, and the screen shot is displayed on the display. Then, at the time when the activation of the application is completed, the content stored in the frame buffer is replaced with a rendered content generated by the application. Thereafter, display data of the application is displayed on the display. Actually, the display data of the application is not displayed until the activation of the application is completed. In contrast, when a screen shot is displayed immediately after the start of the activation of the application, a user feels that a waiting time to the completion of the activation process is shortened.

Further, as a technique related to display control of an image, there is a technique disclosed in Patent Literature 1. Patent Literature 1 relates to a display control apparatus that generates a display image by combining a plurality of pieces of compressed block data. In Patent Literature 1, when an image that is the same as an image already displayed on a screen is displayed, high-speed image display is implemented by using image data already decompressed on image data storage means.

CITATION LIST

Patent Literature

[PTL 1] Japanese Laid-Open Patent Publication No. 7-44155

SUMMARY OF THE INVENTION

Problems to be Solved by the Invention

In order that it is felt that a waiting time to completion of activation of an application is shortened, it is considered that the screen shot technique is also applied to a client apparatus implementing the above remote UI.

However, when a remote UI and display control of a screen shot are combined, the following problem arises.

Generation of a screen shot is performed by an apparatus that uses a screen shot. In other words, in a system that provides a remote UI, after execution of an application, a client apparatus creates a screen shot that indicates a display image of the application and stores the created screen shot in a memory. When the application is activated the next time, the stored screen shot is used.

Meanwhile, in a system that realizes a remote UI, a file that is used by a client apparatus for execution of an application (generation of a display screen) is managed by a server apparatus. Thus, when the file for execution of the application is updated in the server apparatus, a screen shot already stored in the client apparatus (a screen shot created by the client apparatus using the file before the update) is different from display data of the application executed by using the file after the update. As a result, when switching from the screen shot to a generated image of the application, the display content is changed, thereby making a user feel uncomfortable (see FIG. 11B).

Therefore, an object of the present invention is to provide a display control technique that allows a latest screen shot to be displayed on a client apparatus regardless of a file update state in a server apparatus, in a network system that realizes a remote UI.

Solution to the Problems

A screen shot display control apparatus according to the present invention is an apparatus for activating an application by using a file received from a server apparatus, and displaying a screen shot, which is a display image after the activation of the application, during a period from start of the activation of the application to completion of the activation. The screen shot display control apparatus includes: a file reception section for receiving a file required for execution of the application, from the server apparatus; a screen shot generation section for generating a screen shot by using the file received by the file reception section; a screen shot storing section for storing the screen shot generated by the screen shot generation section; a screen shot reception section for, after the file is updated in the server apparatus, receiving a screen shot generated by the server apparatus by using the file after the update, from the server apparatus; and a display selection section for displaying the received screen shot on a display screen when the screen shot reception section receives the screen shot from the server apparatus, and displaying the screen shot stored in the screen shot storing section, on the display screen in the case other than the above.

Alternatively, the screen shot display control apparatus may include: a screen shot reception section for receiving, from the server apparatus, difference data indicating a difference between a first screen shot generated by using the file before update and a second screen shot generated by using the file after the update; and a display selection section for displaying a screen shot obtained by combining the received difference data and the screen shot stored in the screen shot storing section, on a display screen when the screen shot reception section receives the difference data from the server apparatus, and displaying the screen shot stored in the screen shot storing section, on the display screen in the case other than the above.

A screen shot display control method according to the present invention is a method for, in a client apparatus for activating an application by using a file received from a server apparatus, displaying a screen shot, which is an image having a display content at completion of the activation of the application, during a period from start of the activation of the application to the completion of the activation. The screen shot display control method includes: a file reception step of receiving a file required for execution of the application, from the server apparatus; a screen shot generation step of generating a screen shot by using the file received at the file reception step; a screen shot storing step of storing the screen shot generated at the screen shot generation step; a screen shot reception step of, after the file is updated in the server apparatus, receiving a screen shot generated by the server apparatus by using the file after the update, from the server apparatus; and a display selection step of displaying the received screen shot on a display screen when the screen shot is received from the server apparatus at the screen shot reception step, and displaying the screen shot stored at the screen shot storing step, on the display screen in the case other than the above.

Alternatively, the screen shot display control method may include a screen shot reception step of receiving, from the server apparatus, difference data indicating a difference between a first screen shot generated by using the file before update and a second screen shot generated by using the file after the update; and a display selection step of displaying a screen shot obtained by combining the received difference data and the screen shot stored at the screen shot storing step, on a display screen when the difference data is received from the server apparatus at the screen shot reception step, and displaying the screen shot stored at the screen shot storing step, on the display screen in the case other than the above.

A screen shot display control integrated circuit according to the present invention is an integrated circuit functioning as the file reception section, the screen shot generation section, the screen shot storing section, the screen shot reception section, and the display selection section that are described above.

Further, a server apparatus according to the present invention is an apparatus for transmitting a screen shot during a period from start of activation of an application to completion of the activation, to a client apparatus for displaying a screen shot that is a display image at the completion of the activation of the application. The server apparatus includes: a file transmission section for transmitting a file required for executing the application on the client apparatus, to the client apparatus in response to a request from the client apparatus; a screen shot generation section for, after the file is updated, generating a screen shot by using the file after the update; a screen shot storing section for storing the screen shot generated by the screen shot generation section; a transmission determination section for, when activation of the application is notified from the client apparatus, determining whether or not the screen shot stored in the screen shot storing section has been updated after last execution of the application; and a screen shot transmission section for transmitting the screen shot stored in the screen shot storing section, to the client apparatus when the transmission determination section determines that the screen shot stored in the screen shot storing section has been updated.

Alternatively, the server apparatus may include: a screen shot storing section for storing a first screen shot generated by using the file before the update and a second screen shot generated by using the file after the update; a transmission determination section for, when activation of the application is notified from the client apparatus, determining whether or not the second screen shot stored in the screen shot storing section has been updated after last execution of the application; and a screen shot transmission section for transmitting difference data indicating a difference between the first screen shot and the second screen shot, when the transmission determination section determines that the second screen shot has been updated.

Advantageous Effects of the Invention

According to the present invention, a latest screen shot can be displayed on a client apparatus regardless of a file update state in a server apparatus.

BRIEF DESCRIPTION OF THE DRAWINGS

FIG. 2 is a diagram illustrating an example of a screen displayed on a client apparatus in FIG. 1.

FIG. 3A is a diagram illustrating an example of a file format required for execution of an application.

FIG. 3B is a diagram illustrating an example of a file format of a screen shot.

FIG. 13 is a diagram illustrating an example of screen shots and difference data.

DESCRIPTION OF EMBODIMENTS

Hereinafter, a display control system according to each embodiment of the present invention and a server apparatus and a client apparatus that constitute the display control system will be described with reference to the drawings. Hereinafter, as an example, a system will be described in which a server apparatus having a function of recording a program provides a remote user interface (UI) for viewing or manipulating recording information, to a client apparatus via a network. Note that, in addition to the case where the server apparatus has a function of recording a program, a display control method of the present invention is similarly applicable to a system in which a remote UI is realized via a network.

First Embodiment

Figure 1:
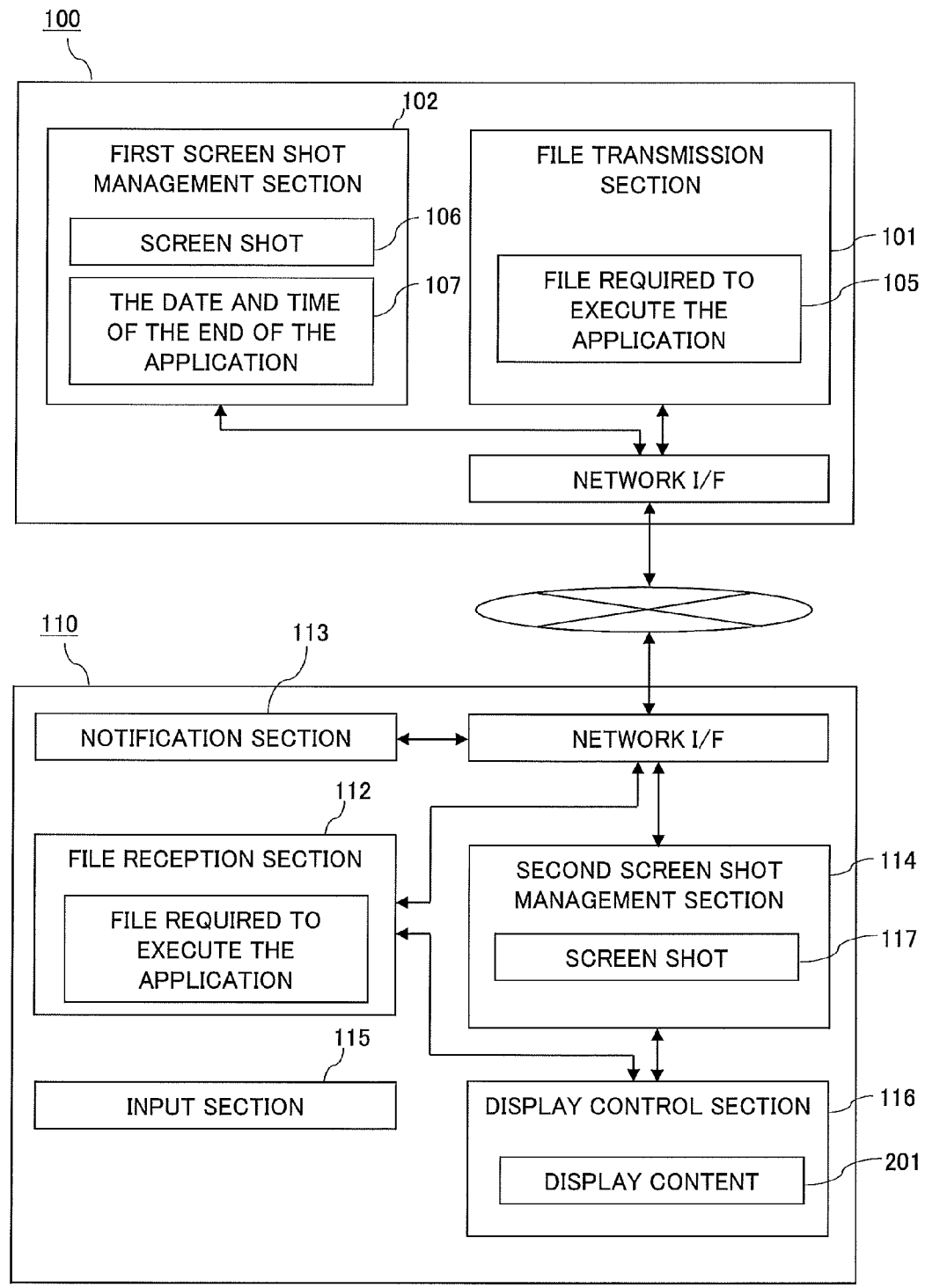
FIG. 1 is a block diagram of a display control system according to a first embodiment of the present invention.

FIG. 1 is a block diagram of a display control system according to a first embodiment of the present invention. FIG. 2 is a diagram illustrating an example of a screen displayed on a client apparatus in FIG. 1. In addition, FIG. 3A is a diagram illustrating an example of a file format required for execution of an application, and FIG. 3B is a diagram illustrating an example of a file format of a screen shot.

The display control system according to the present embodiment includes a server apparatus 100 and a client apparatus 110 that are connected to each other via a network. The server apparatus 100 provides a remote UI to the client apparatus 110 and is capable of being remotely controlled by the client apparatus 110 via the network.

A display content 201 in FIG. 2 is an example of an operation screen displayed on a display section of the client apparatus 110 and serves as a user interface that receives an input from a user. In a recorded program list in FIG. 2, four recorded programs (titles A to D) are listed. The server apparatus 100 is remotely controlled through the user interface on the display content 201, whereby recording information can be confirmed or changed and a process of reproducing or fast-forwarding a recorded program can be performed.

The server apparatus 100 includes a file transmission section 101, a first screen shot management section 102, and a network interface (I/F). The file transmission section 101 and the first screen shot management section 102 are connected to the network via the network I/F and communicable with the client apparatus 110.

The file transmission section 101 stores a file 105 required for the client apparatus 110 to execute the application to display the user interface. Further, when activation of the application is notified from the client apparatus 110, the file transmission section 101 transmits the file 105 to the client apparatus 110 according to a request from the client apparatus 110.

As shown in FIG. 3A, the file 105 includes display contents and layout information. The layout information consists of data that defines arrangement of the display contents and objects (buttons, tabs, list boxes, and the like), and is described, for example, by XML (Extensible Markup Language). The display contents include at least one of a still image, a moving image, or character information. When a recorded program list is displayed, the titles, the channels, the recorded dates, image data of icons, and the like, of recorded programs correspond to the display contents.

The first screen shot management section 102 monitors an update state of the file 105 managed by the file transmission section 101, and generates a screen shot in accordance with an updated content of the file 105. In addition, the first screen shot management section 102 transmits a screen shot to the client apparatus 110 in accordance with a request from the client apparatus 110. Further, when end of the application is notified from the client apparatus 110, the first screen shot management section 102 records the date and time of the end of the application. The date and time of the end of the application is used for determining which a screen shot stored in the client apparatus 110 or a screen shot stored in the first screen shot management section 102 is latest. This determination process will be described later.

A screen shot is an image displayed on a display screen of the client apparatus 110 while the application is executed on the server apparatus 100, and is an initial image displayed immediately after start of activation of the application or a display image displayed immediately after completion of the activation of the application. As shown in FIG. 3B, a screen shot includes an application name, last update date and time, an operation screen name, and a screen shot bitmap. The application name is the name of an application corresponding to the screen shot. The last update date and time is date and time when the screen shot is stored. The operation screen name indicates which of display screens displayed by the application the screen shot is. For example, in the case of a screen structure in which an operation screen can be switched by using tabs, a name corresponding to each tab can be set as an operation screen name. The screen shot bitmap is obtained by storing screen data as a bitmap. A screen to be stored as a screen shot is different for each application. Which screen is to be stored as a screen shot is described, for example, in layout information. Further, a plurality of screen shots can be created for each display screen.

Meanwhile, the client apparatus 110 includes a file reception section 112, a notification section 113, a second screen shot management section 114, an input section 115, a display control section 116, and a network I/F. The file reception section 112, the notification section 113, and the second screen shot management section 114 are connected to the network via the network I/F and communicable with the server apparatus 100.

The notification section 113 notifies the server apparatus 100 about activation or end of the application on the client apparatus 110.

The file reception section 112 requests the server apparatus 100 to transmit the file 105 required for executing the application. In addition, the file reception section 112 receives the file 105 transmitted from the server apparatus 100 and stores the received file 105 in a storage device such as a memory or a hard disk.

The second screen shot management section 114 requests the server apparatus 100 to transmit a screen shot, and receives a screen shot 106 transmitted from the server apparatus 100. The screen shot 106 is a display image displayed on the display screen when the application is executed on the client apparatus 110 by using the file 105 after update. The received screen shot 106 is stored in the storage device such as a memory or a hard disk. In addition, the second screen shot management section 114 generates a screen shot 117 by using display data generated by the application on the client apparatus 110.

The input section 115 receives a user input such as an instruction to activate the application. The input section 115 is, for example, a button or a keyboard.

The display control section 116 executes the application by using the file 105 received from the server apparatus 100, and generates display data of the application. The display control section 116 includes a display screen such as a display, and displays any of the display data of the application, the screen shot 106 received from the server apparatus 100, and the screen shot 117 generated by the client apparatus 110.

Hereinafter, screen shot display control according to the present invention will be described in detail.

Figure 4:
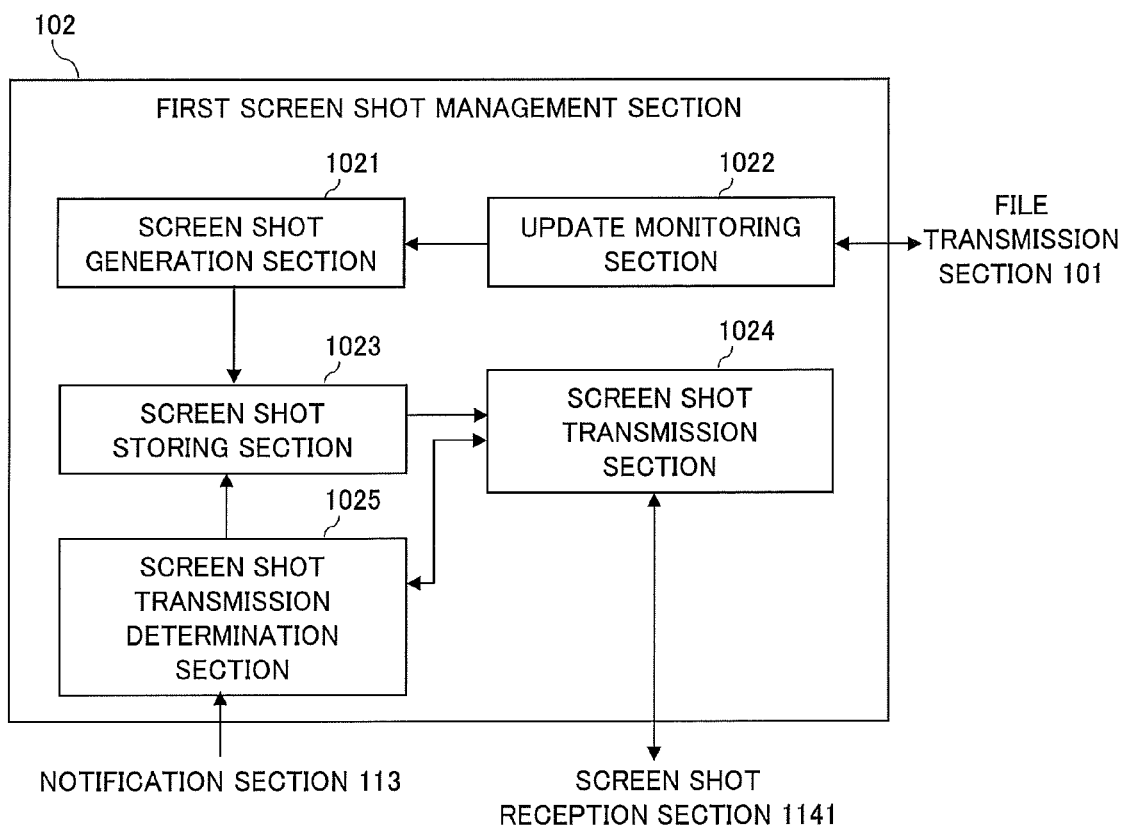
FIG. 4 is a block diagram illustrating a configuration of a first screen shot management section in FIG. 1.

FIG. 4 is a block diagram illustrating a configuration of the first screen shot management section in FIG. 1.

The first screen shot management section 102 includes a screen shot generation section 1021, an update monitoring section 1022, a screen shot storing section 1023, a screen shot transmission section 1024, and a screen shot transmission determination section 1025.

The update monitoring section 1022 monitors an update state of the file managed by the file transmission section 101 (the file required for execution of the application on the client apparatus). When the file is updated, the update monitoring section 1022 instructs the screen shot generation section 1021 to generate a screen shot.

In response to the instruction from the update monitoring section 1022, the screen shot generation section 1021 generates a screen shot that is a display image displayed on the client apparatus when the application is executed by using the file after the update.

The screen shot storing section 1023 stores the screen shot generated by the screen shot generation section 1021.

When receiving an instruction to transmit a screen shot from a screen shot reception section 1141 (FIG. 5), the screen shot transmission section 1024 inquires of the screen shot transmission determination section 1025 about whether or not it is necessary to transmit a screen shot. When the screen shot transmission determination section 1025 determines that it is necessary to transmit a screen shot, the screen shot transmission section 1024 transmits the screen shot stored in the screen shot storing section 1023, to the screen shot reception section 1141. When the screen shot transmission determination section 1025 determines that it is not necessary to transmit a screen shot, the screen shot transmission section 1024 transmits, to the screen shot reception section 1141, the effect that the screen shot has not been updated.

When receiving a notification of end of the application from the notification section 113, the screen shot transmission determination section 1025 records the date and time of the end of the application. When inquired from the screen shot transmission section 1024 about whether or not it is necessary to transmit a screen shot, the screen shot transmission determination section 1025 compares the last update date and time of the screen shot stored in the screen shot storing section 1023 to the date and time of the end of the application at the last time. When the last update date and time is later than the date and time of the end of the application at the last time, the screen shot transmission determination section 1025 notifies the screen shot transmission section 1024 that it is necessary to transmit a screen shot created by the server apparatus. In the case other than the above, the screen shot transmission determination section 1025 notifies the screen shot transmission section 1024 that it is not necessary to transmit a screen shot.

Figure 5:
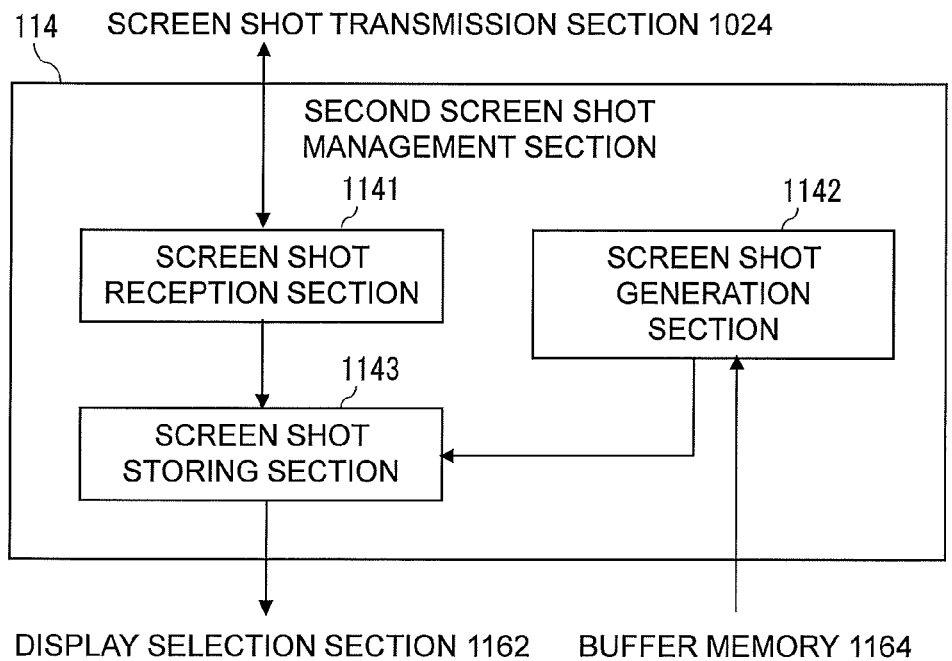
FIG. 5 is a block diagram illustrating a configuration of a second screen shot management section in FIG. 1.

FIG. 5 is a block diagram illustrating a configuration of the second screen shot management section in FIG. 1.

The second screen shot management section 114 includes the screen shot reception section 1141, a screen shot generation section 1142, and a screen shot storing section 1143.

The screen shot reception section 1141 receives a screen shot transmitted from the screen shot transmission section 1024 (FIG. 4). The screen shot generation section 1142 generates a screen shot from display data generated by the application. The screen shot storing section 1143 stores the screen shot received by the screen shot reception section 1141 and the screen shot generated by the screen shot generation section 1142. In addition, the screen shot storing section 1143 can store a plurality of types of screen shots.

Figure 6:
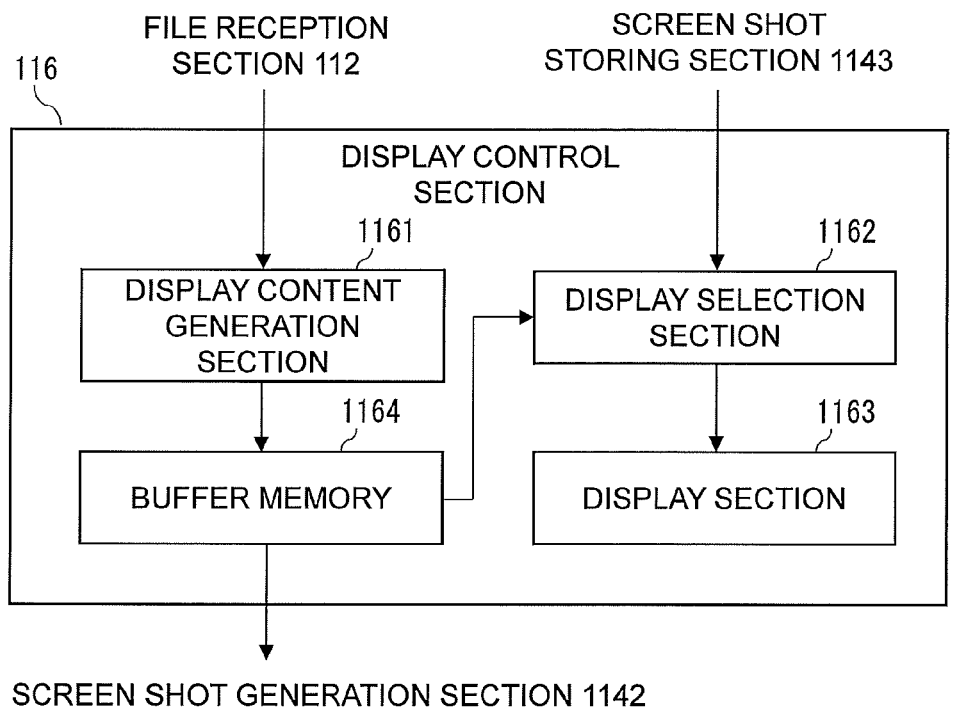
FIG. 6 is a block diagram illustrating a configuration of a display control section in FIG. 1.

FIG. 6 is a block diagram illustrating a configuration of the display control section in FIG. 1.

The display control section 116 includes a display content generation section 1161, a display selection section 1162, a display section 1163, and a buffer memory 1164.

The display content generation section 1161 generates display data of the application by using the file received by the file reception section 112. The generated display data is stored in the buffer memory 1164.

The display section 1163 includes a display screen such as a liquid crystal display, and displays a content selected by the display selection section 1162.

The display selection section 1162 selects which the display data generated by the display content generation section 1161 or the screen shot is to be displayed, and instructs the display section 1163 to display the selected data. Specifically, during a period from start of activation of the application on the client apparatus 110 to completion of the activation, the display selection section 1162 outputs the screen shot to the display section 1163. After the activation of the application, the display selection section 1162 reads out the display data generated by the application from the buffer memory 1164, and outputs the display data to the display section 1163. In addition, when displaying a screen shot, the display selection section 1162 displays either of the screen shot 106 generated by the server apparatus 100 or the screen shot 117 generated by the screen shot generation section 1142, on the display screen.

Hereinafter, a display control process according to the present embodiment will be described. In the following, a description will be given with the reference character of each section in FIGS. 1 and 4 to 6.

Figure 7:
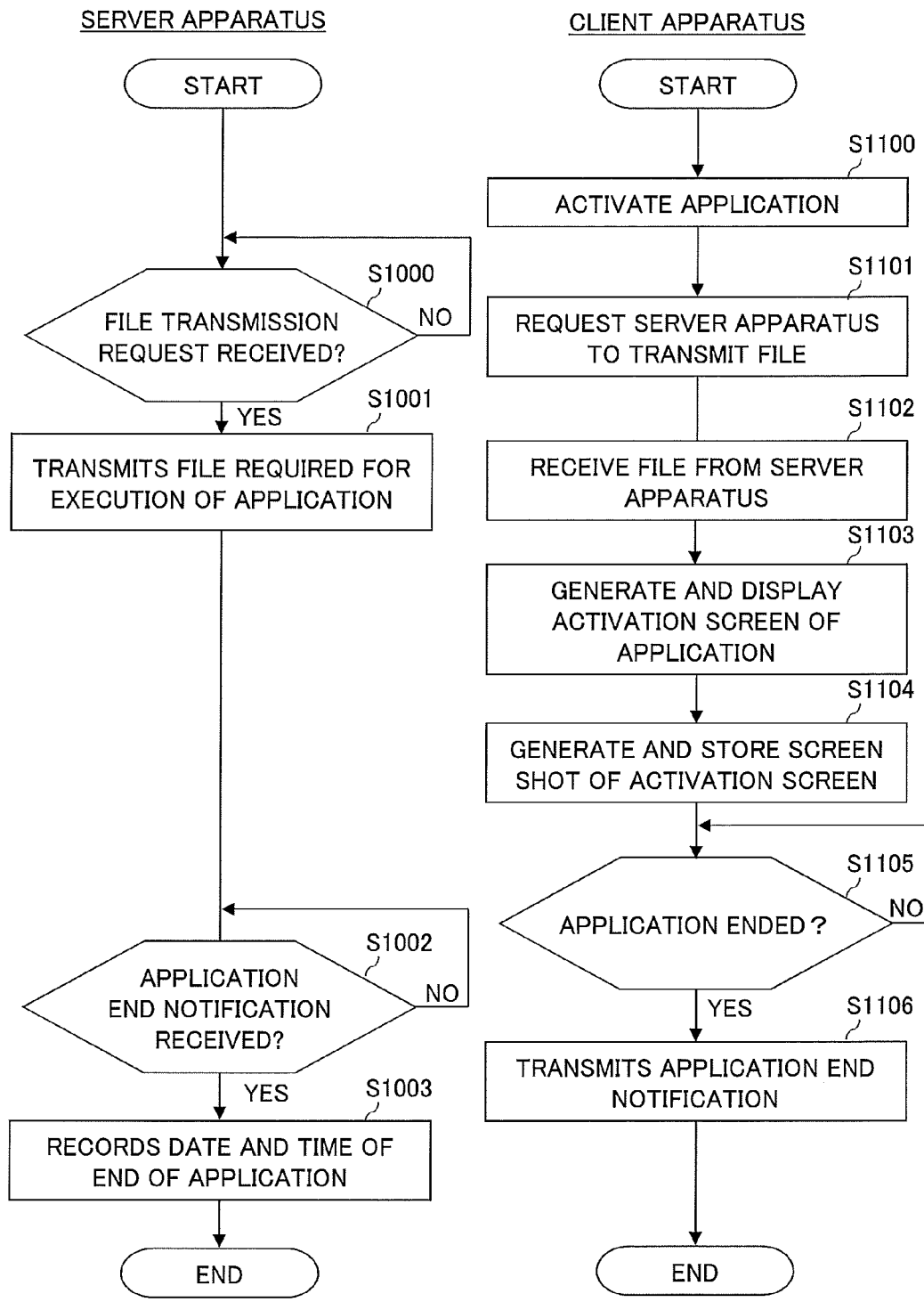
FIG. 7 is a flowchart illustrating a screen shot generation process performed by the client apparatus according to the first embodiment.

FIG. 7 is a flowchart illustrating a screen shot generation process performed by the client apparatus according to the first embodiment. The flowchart in FIG. 7 illustrates a process performed when the application is executed on the client apparatus 110 for the first time. Thus, at this stage, no screen shot is stored in the client apparatus 110.

First, a control process performed by the server apparatus 100 will be described.

At step S1000, the server apparatus 100 waits until receiving a file transmission request from the client apparatus (No at step S1000). When the file transmission section 101 receives the file transmission request (Yes at step S1000), the control process proceeds to step S1001.

At step S1001, the file transmission section 101 transmits the file 105 required for execution of the application, to the file reception section 112.

At step S1002, the server apparatus 100 waits until receiving an application end notification from the client apparatus 110 (No at step S1002). When the screen shot transmission determination section 1025 receives the application end notification from the notification section 113 (Yes at step S1002), the control process proceeds to step S1003.

At step S1003, the screen shot transmission determination section 1025 records the date and time of end of the application.

Next, a control process performed by the client apparatus 110 will be described.

At step S1100, in response to a user instruction inputted from the input section 115, the display content generation section 1161 notifies the server apparatus 100 that the application is activated.

At step S1101, the display content generation section 1161 requests the file reception section 112 to transmit the file 105 required for execution of the application.

At step S1102, the file reception section 112 receives the file 105 transmitted from the file transmission section 101.

At step S1103, the display content generation section 1161 executes the application by using the file 105 received by the file reception section 112, and generates an activation screen of the application. At this stage, no screen shot is stored. Thus, the display selection section 1162 displays the display data generated by the display content generation section 1161, on the display section 1163.

At step S1104, the display content generation section 1161 outputs display data generated by execution of the application, to the screen shot generation section 1142, and instructs the screen shot generation section 1142 to generate a screen shot. The screen shot generation section 1142 generates a still image (activation screen) to be displayed during activation, by using the display data. The screen shot generation section 1142 stores the generated still image as a screen shot 117 in the screen shot storing section 1143.

At step S1105, the display control section 116 displays the display data of the application on the display section 1163 until receiving an instruction to end the application from the input section 115 (No at step S1105). When receiving the instruction to end the application from the input section 115 (Yes at step S1105), the display content generation section 1161 performs a process of ending the application, and clears the display data in the buffer memory 1164.

At step S1106, the notification section 113 transmits an application end notification to the screen shot transmission determination section 1025.

At step S1104 described above, a screen shot of the activation screen is generated and stored. The screen shot generated at this timing is effective particularly for an application that displays an initial screen at its activation. Alternatively, the screen shot 117 may be generated at end of the application. In this case, the display content generation section 1161 performs the process at step S1104 before performing the process of ending the application. The screen shot generated at this timing is effective particularly for the case where a display image that is displayed at last end of the application is displayed at next activation of the application.

Figure 8:
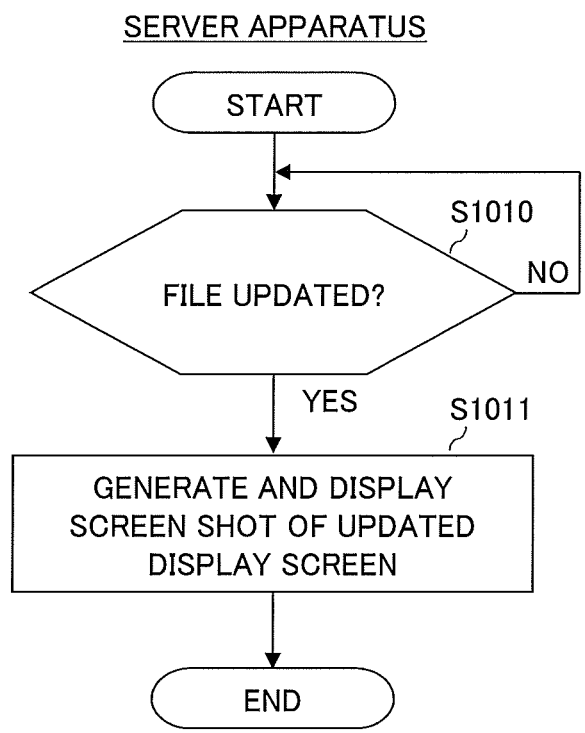
FIG. 8 is a flowchart illustrating a screen shot generation process performed by a server apparatus according to the first embodiment.

FIG. 8 is a flowchart illustrating a screen shot generation process performed by the server apparatus according to the first embodiment.

At step S1010, the update monitoring section 1022 monitors whether or not the file 105 required for execution of the application has been updated. Specifically, the update monitoring section 1022 monitors whether or not the content of the file 105 has changed or whether or not a display image immediately after activation of the application has changed. When the file 105 has been updated (Yes at step S1010), the process proceeds to step S1011. The monitoring of update of the file 105 may be performed repeatedly at regular intervals or may be performed only at update of the file.

At step S1011, the screen shot generation section 1021 generates a still image to be generated at activation of the application on the client apparatus 110, by using the file 105 after the update, and stores the generated still image as a screen shot 106 in the screen shot storing section 1023.

Figure 9:
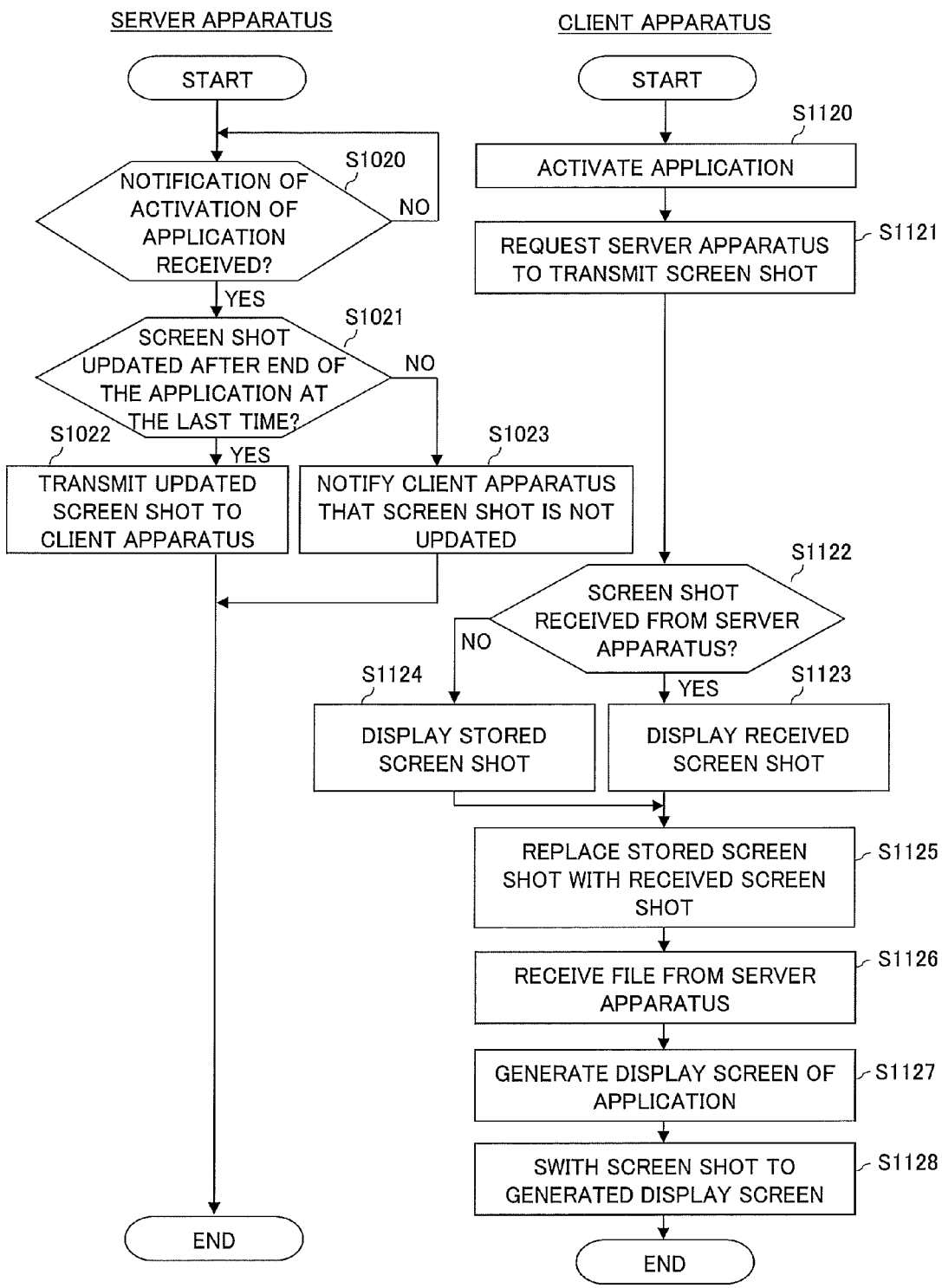
FIG. 9 is a flowchart illustrating a screen shot update/display process according to the first embodiment.

FIG. 9 is a flowchart illustrating a screen shot update/display process according to the first embodiment. The flowchart in FIG. 9 illustrates a process performed when the application is activated on the client apparatus 110 for the second time or thereafter. Thus, at this stage, a screen shot is stored in the client apparatus 110.

First, a control process performed by the server apparatus 100 will be described.

At step S1020, the server apparatus 100 waits until receiving a request to transmit a screen shot from the screen shot reception section 1141 (No at step S1020). When the screen shot transmission determination section 1025 receives the request to transmit a screen shot (Yes at step S1020), the process proceeds to step S1021.

At step S1021, the screen shot transmission determination section 1025 determines whether or not the screen shot has been updated after end of the application at the last time. Specifically, the screen shot transmission determination section 1025 compares the last update date and time of the screen shot 106 stored in the screen shot storing section 1023 to the date and time of the end of the application at the last time. When the last update date and time of the screen shot 106 is later than the date and time of the end of the application at the last time, the screen shot transmission determination section 1025 determines that the screen shot has been updated, and the control process proceeds to step S1022. In the case other than the above, the screen shot transmission determination section 1025 determines that the screen shot has not been updated, and the control process proceeds to step S1023.

At step S1022, the screen shot transmission section 1024 transmits the screen shot 106 stored in the screen shot storing section 1023, to the screen shot reception section 1141.

At step S1023, the screen shot generation section 1021 notifies the screen shot reception section 1141 that the screen shot has not been updated.

Next, a control process performed by the client apparatus 110 will be described.

At step S1120, in response to an instruction received by the input section 115, the display content generation section 1161 notifies the server apparatus 100 about activation of the application.

At step S1121, the screen shot reception section 1141 requests the screen shot transmission determination section 1025 to transmit the screen shot 106.

At step S1122, the display content generation section 1161 determines whether or not the screen shot 106 has been received by the screen shot reception section 1141 from the server apparatus 100. When the screen shot has been received by the screen shot reception section 1141 (Yes at step S1123), the control process proceeds to step S1124. In the case other than the above (No at step S1123), the control process proceeds to step S1125.

At step S1123, the display selection section 1162 displays the received screen shot 106 on the display section 1163.

At step S1124, the display selection section 1162 reads out the screen shot 117 stored in the screen shot storing section 1143 and displays the read screen shot 117 on the display section 1163.

At step S1125, the screen shot reception section 1141 stores the received screen shot in the screen shot storing section 1143 to replace the stored screen shot 117 with the received screen shot. The process at step S1125 may be performed before the received screen shot 106 is displayed, and the screen shot read out from the screen shot storing section 1143 may be always displayed on the display section 1163.

At step S1126, the file reception section 112 receives the file 105 transmitted from the file transmission section 101.

At step S1127, the display content generation section 1161 executes the application by using the file 105 received by the file reception section 112, and generates display data of the application.

At step S1128, at the time when the activation of the application by the display content generation section 1161 is completed, the display selection section 1162 switches the display of the display section 1163 from the screen shot to the display data generated by the application.

Here, transition of the screen displayed on the display section 1163 of the client apparatus will be described.

Figure 10:
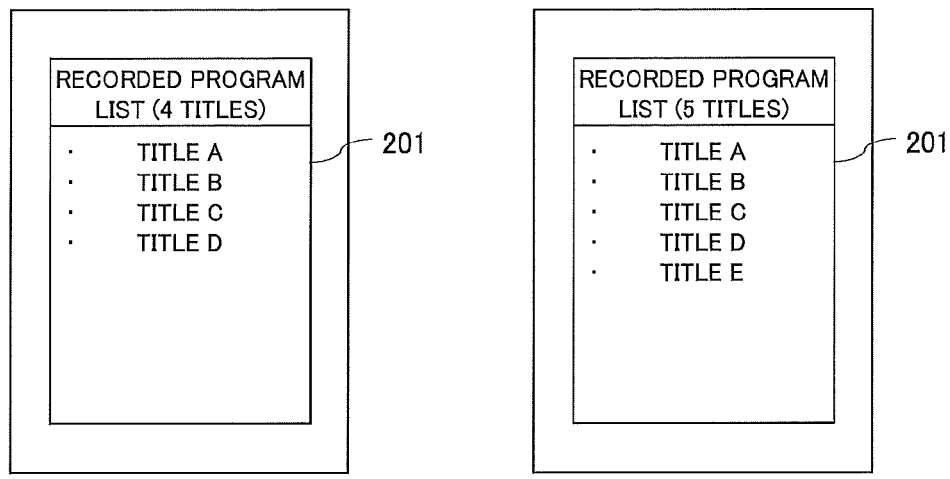
FIG. 10 is a diagram illustrating an example of screen shots.

FIG. 10 is a diagram illustrating an example of screen shots. Specifically, FIG. 10(a) illustrates an example of the screen shot 117 generated by the client apparatus 110, and FIG. 10(b) illustrates the screen shot 106 generated by the server apparatus 100 after the file 105 is updated. In the example in FIG. 10, as a result of the file 105 in the server apparatus 100 being updated after the application is ended on the client apparatus 110 at the last time, the display content displayed immediately after activation of the application is changed.

Figure 11A:
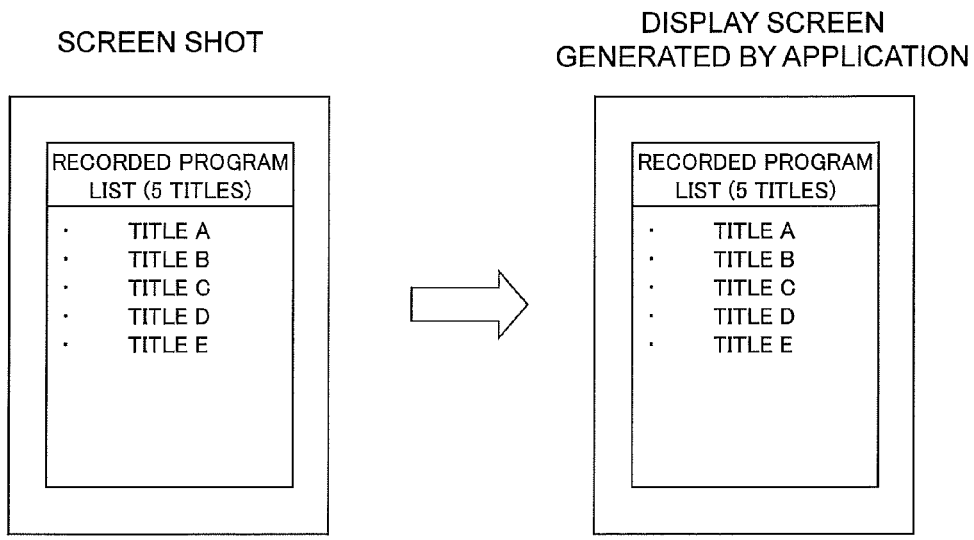
FIG. 11A is a diagram illustrating a screen display of the client apparatus according to the first embodiment.
Figure 11B:
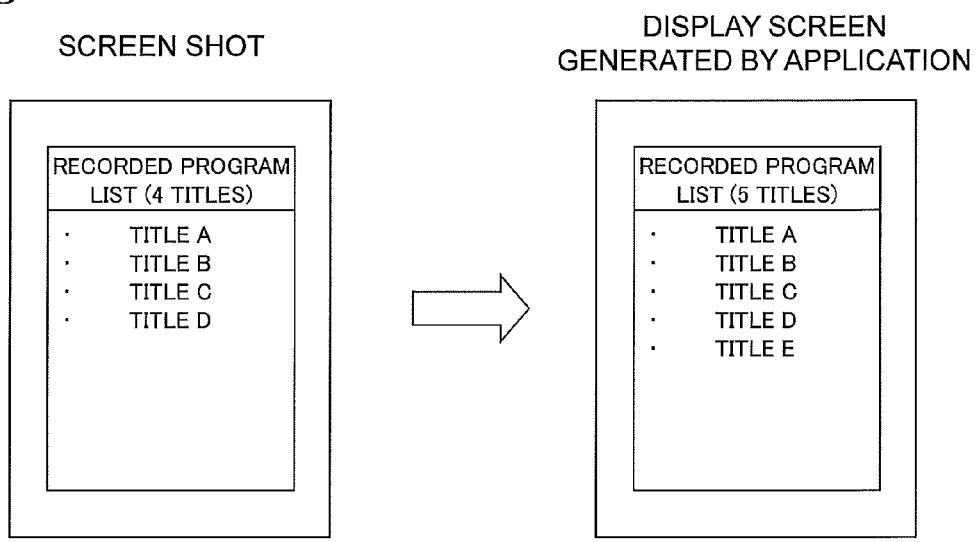
FIG. 11B is a diagram illustrating a screen display of a client apparatus according to a reference example.

FIG. 11A is a diagram illustrating a screen display of the client apparatus according to the first embodiment, and FIG. 11B is a diagram illustrating a screen display of a client apparatus according to a reference example.

In the display control system according to the present embodiment, the server apparatus 100 determines whether or not the display image of the application has changed during a period from end of the application at the last time to activation of the application at the next time. Then, a newer one of the screen shot created by the server apparatus 100 or the screen shot stored in the client apparatus 110 is displayed on the display section 1163 of the client apparatus 110. Therefore, as shown in FIG. 11A, the screen shot displayed before activation of the application is the same as the display image displayed after the activation of the application, and hence the user is not made to feel uncomfortable.

When the control method as in the present embodiment is not used and the screen shot stored in the client apparatus 110 is always displayed, the display image is different between before and after activation of the application, as shown in FIG. 11B. In this case, the user is made to feel uncomfortable.

As described above, in the control method according to the present embodiment, the version of the screen shot held by the client apparatus 110 is managed by the server apparatus 100, and thus the latest screen shot can be always displayed on the client apparatus 110.

Second Embodiment

Figure 12:
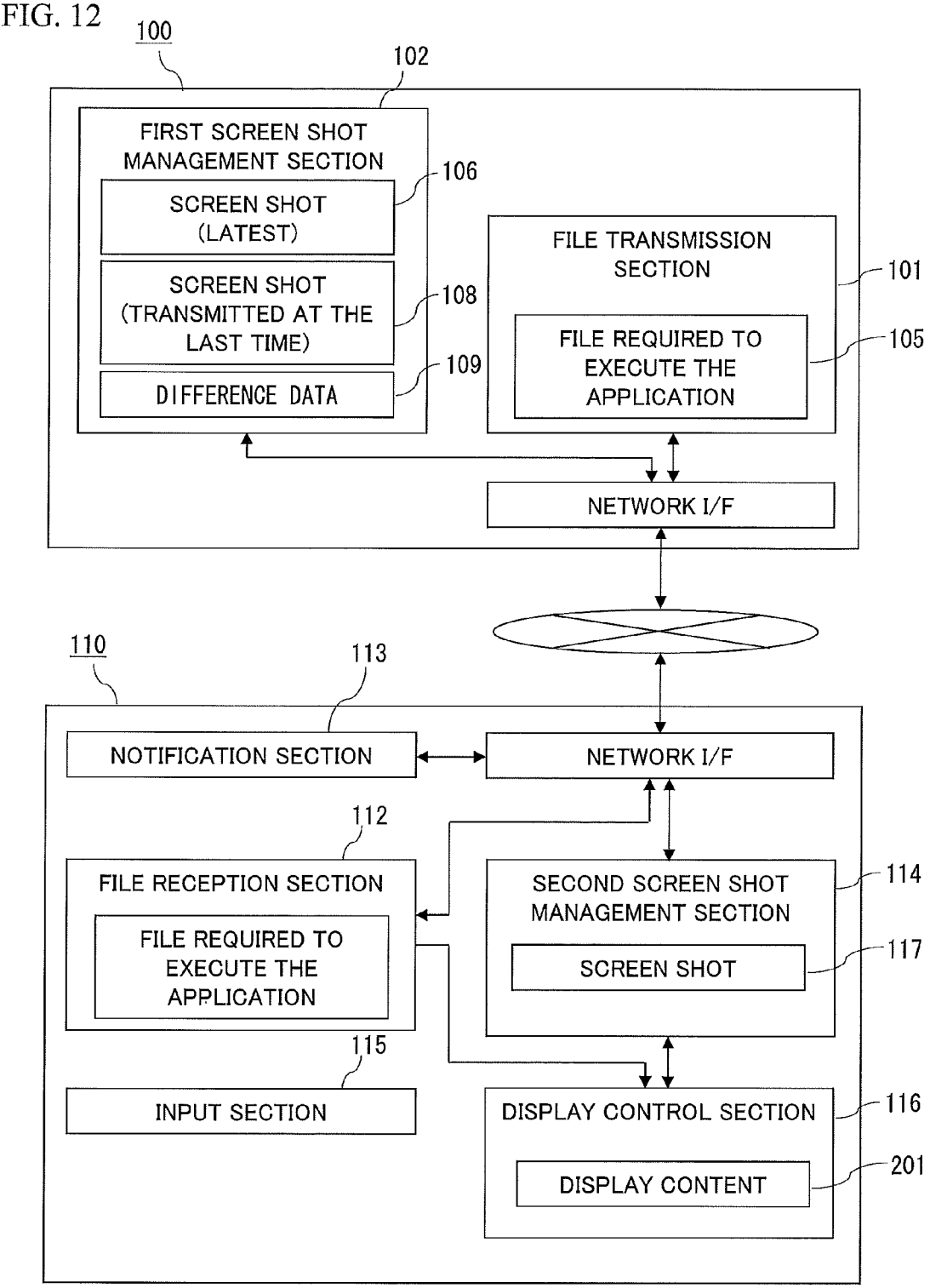
FIG. 12 is a block diagram of a display control system according to a second embodiment of the present invention.

FIG. 12 is a block diagram of a display control system according to a second embodiment of the present invention, and FIG. 13 is a diagram illustrating an example of screen shots and difference data.

The present embodiment differs from the first embodiment in data transmitted from the server apparatus 100 to the client apparatus 110. Specifically, in the present embodiment, after the file 105 is updated in the server apparatus 100, instead of transmitting a screen shot corresponding to the updated file, only difference data between the latest screen shot and the screen shot held by the client apparatus 110 is transmitted. Hereinafter, the difference between the present embodiment and the first embodiment will be mainly described.

The fundamental configurations of the first screen shot management section 102 and the second screen shot management section 114 according to the present embodiment are the same as those shown in FIGS. 4 and 5.

However, in the first screen shot management section 102, the screen shot storing section 1023 stores a screen shot 106 (FIG. 13(a)) corresponding to a display image when the application is executed by using the file 105 after update, a screen shot 108 (FIG. 13(b)) that is the same as that held in the client apparatus 110, and difference data 109 (FIG. 13(c)) between the screen shots 106 and 108. The screen shot 108 is data generated by the screen shot generation section by using the file before update, and is generated when a screen shot or difference data is transmitted to the client apparatus 110 at the last time. The difference data 109 is generated by the screen shot generation section 1021 according to known various methods when data is transmitted to the client apparatus 110. The difference data 109 may be deleted after being transmitted to the client apparatus 110.

Further, in the second screen shot management section 114, the screen shot reception section 1141 receives the difference data transmitted from the screen shot transmission section 1024. The screen shot reception section 1141 combines the received difference data and the screen shot stored in the screen shot storing section 1143 to generate a screen shot corresponding to the latest file 105.

Figure 14:
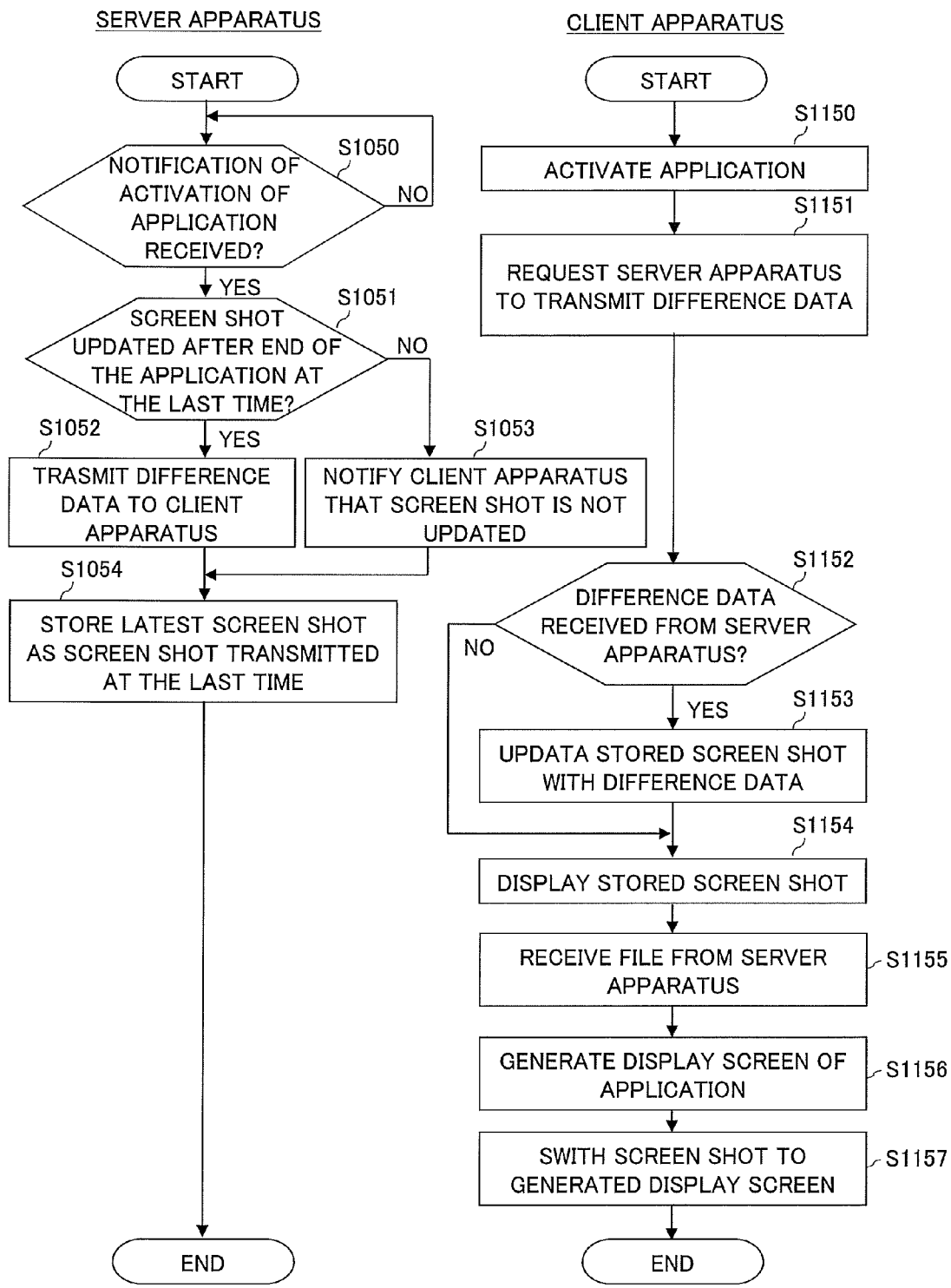
FIG. 14 is a flowchart illustrating a screen shot update/display process according to the second embodiment.

FIG. 14 is a flowchart illustrating a screen shot update/display process according to the second embodiment.

First, a control process performed by the server apparatus 100 will be described.

At step S1050, the server apparatus 100 waits until receiving an instruction to transmit difference data from the screen shot reception section 1141 (No at step S1050). When the screen shot transmission determination section 1025 receives the instruction to transmit difference data (Yes at step S1050), the control process proceeds to step S1051.

At step S1051, the screen shot transmission determination section 1025 determines whether or not the screen shot has been updated after end of the application at the last time. Specifically, the screen shot transmission determination section 1025 compares the latest screen shot 106 stored in the screen shot storing section 1023 to the screen shot 108 that is the same as that held by the client apparatus 110 (a screen shot generated at the transmission of the last time). When the screen shots 106 and 108 are different from each other, the screen shot transmission determination section 1025 determines that the screen shot has been updated, the control process proceeds to step S1052. In the case other than the above, the screen shot transmission determination section 1025 determines that the screen shot has not been updated, and the control process proceeds to step S1053.

At step S1052, the screen shot generation section 1021 generates difference data 109 between the screen shots 106 and 108. The screen shot transmission section 1024 transmits the generated difference data 109 to the screen shot reception section 1141.

At step S1053, the screen shot transmission section 1024 notifies the screen shot reception section 1141 that the screen shot has not been updated, instead of transmitting the screen shot.

At step S1054, the screen shot generation section 1021 replaces the screen shot 108 transmitted at the last time with the latest screen shot 106.

Next, a control process performed by the client apparatus 110 will be described.

At step S1150, in response to an instruction received by the input section 115, the display content generation section 1161 instructs the server apparatus 100 to activate the application.

At step S1151, the screen shot reception section 1141 requests the screen shot transmission determination section 1025 to transmit difference data for updating the screen shot.

At step S1152, the display content generation section 1161 determines whether or not the screen shot reception section 1141 has received the difference data from the server apparatus 100. When the screen shot reception section 1141 has received the difference data (Yes at step S1152), the control process proceeds to step S1153. In the case other than the above (No at step S1152), the control process proceeds to step S1154.

At step S1153, the screen shot reception section 1141 combines the received difference data and the screen shot stored in the screen shot storing section 1143 and updates the screen shot.

At step S1154, the display selection section 1162 reads out the screen shot stored in the screen shot storing section 1143, and displays the read screen shot on the display section 1163.

At step S1155, the file reception section 112 receives the file 105 transmitted from the file transmission section 101.

At step S1156, the display content generation section 1161 executes the application by using the file 105 received by the file reception section 112, and generates display data.

At step S1157, at the time when the activation of the application by the display content generation section 1161 is completed, the display selection section 1162 switches the display of the display section 1163 from the screen shot to the display data generated by the application.

Note that a screen shot generation process performed by the client apparatus 110 and a screen shot generation process performed by the server apparatus 100 at activation of the application for the first time are the same as those shown in FIGS. 7 and 8, and thus the description thereof is omitted.

When the difference data is transmitted for updating the screen shot held by the client apparatus 110 as in the present embodiment, the amount of data transmitted from the server apparatus 100 to the client apparatus 110 can be reduced. Thus, the screen shot can be updated at a higher speed.

The client apparatuses according to the first and second embodiments described above are typically realized as LSIs that are semiconductor integrated circuits. They may be individually made into one chip, or a part or all of them may be made into one chip. Although the LSI is described here, the integrated circuit may be referred to as an IC, a system LSI, a super LSI, or an ultra LSI depending on difference in integration degree.

A technique of integrated circuit implementation is not limited to the LSI, but may be achieved by a dedicated circuit or a universal processor. An FPGA (Field Programmable Gate Array), which is programmable after production of an LSI, and a reconfigurable processor in which the connection and the setting of a circuit cell inside the LSI are reconfigurable, may be used.

Further, needless to say, if a technique of integrated circuit implementation, which replaces the LSI, appears as a result of advancement of semiconductor technique or another technique derived therefrom, function blocks may be integrated by using the technique. Adaptation of a bio technique could be one possibility.

Moreover, rendering apparatuses suitable for various purposes can be configured by combining: a semiconductor chip in which the client apparatus according to the present invention is integrated; and a display for rendering an image. The present invention can be used as information rendering means in mobile phones, televisions, digital video recorders, digital video cameras, car navigation systems, and the like. Cathode ray tubes (CRTs) as well as flat displays such as liquid crystal displays, PDPs (plasma display panels), and organic EL displays, projection type displays such as projectors, and the like can be used as the display for the combination.

Further, the screen shot display control method according to the present invention is applicable to not only the period from the start of the activation of the application to the completion of the activation but also a screen transition period during which a waiting time occurs (e.g., a period during which a display content changes by switching a tab on the screen).

INDUSTRIAL APPLICABILITY

The present invention is useful in order that it is made to feel that a waiting time required for activation of an application is shortened, in a configuration in which display data of the application executed on a server side is displayed on an apparatus on a client side via a network. For example, the present invention can be used for screen display control of a client apparatus that operates a television and a digital video recorder by using a network apparatus.

DESCRIPTION OF THE REFERENCE CHARACTERS

100 server apparatus
101 file transmission section
102 first screen shot management section
105 file required for execution of application
106, 108, 117 screen shot
109 difference data
110 client apparatus
112 file reception section
113 notification section
114 first screen shot management section
115 input section
116 display control section
1021, 1142 screen shot generation section
1022 update monitoring section
1023, 1143 screen shot storing section
1141 screen shot reception section
1161 display content generation section
1162 display selection section
1163 display section

The invention claimed is:

1. A screen shot display control apparatus for activating an application by using a file received from a server apparatus, and displaying a screen shot, the screen shot display control apparatus comprising:
   a processor; and
   a non-transitory memory having stored thereon executable instructions, which when executed by the processor, cause the screen shot display apparatus to perform:
   a file reception step of receiving a file required for execution of the application, from the server apparatus;
   a screen shot generation step of generating a first screen shot by using the file received at the file reception step, the first screen shot being a display image that is to be displayed on a display screen only during a period from a start of an activation of the application to a completion of the activation of the application;
   a screen shot storing step of storing the first screen shot generated at the screen shot generation step;
   a screen shot reception step of, after the file is updated in the server apparatus, receiving a second screen shot generated by the server apparatus by using the file after the update, from the server apparatus, the second screen shot being a display image that is to be displayed on the display screen only during the period from the start of the activation of the application to the completion of the activation of the application; and
   a display selection step of (i) displaying the received second screen shot on the display screen only during the period from the start of the activation of the application to the completion of the activation of the application when the second screen shot is received from the server apparatus at the screen shot reception step, (ii) displaying the first screen shot stored at the screen shot storing step on the display screen only during the period from the start of the activation of the application to the completion of the activation of the application when the second screen shot is not received from the server apparatus at the screen shot reception step, and (iii) displaying display data generated by the application on the display screen after the period from the start of the activation of the application to the completion of the activation of the application.

2. A screen shot display control apparatus for activating an application by using a file received from a server apparatus and displaying a screen shot, the screen shot display control apparatus comprising:
 a processor; and
 a non-transitory memory having stored thereon executable instructions, which when executed by the processor, cause the screen shot display apparatus to perform:
 a file reception step of receiving a file required for execution of the application, from the server apparatus;
 a screen shot generation step of generating a first screen shot by using the file received at the file reception step, the first screen shot being a display image that is to be displayed on a display screen only during a period from a start of an activation of the application to a completion of the activation of the application;
 a screen shot storing step of storing the first screen shot generated at the screen shot generation step;
 a screen shot reception step of receiving, from the server apparatus, difference data indicating a difference between a screen shot generated by using the file before update and a screen shot generated by using the file after the update; and
 a display selection step of (i) displaying a second screen shot obtained by combining the received difference data and the first screen shot stored at the screen shot storing step on the display screen only during the period from the start of the activation of the application to the completion of the activation of the application when the screen shot reception step receives the difference data from the server apparatus at the screen shot reception step, the second screen shot being a display image that is to be displayed on the display screen only during the period from the start of the activation of the application to the completion of the activation of the application, (ii) displaying the first screen shot stored at the screen shot storing step on the display screen only during the period from the start of the activation of the application to the completion of the activation of the application when the screen shot reception step does not receive the difference data from the server apparatus at the screen shot reception step, and (iii) displaying display data generated by the application on the display screen after the period from the start of the activation of the application to the completion of the activation of the application.

3. The screen shot display control apparatus according to claim 1, wherein the screen shot generation step generates the first screen shot at the completion of the activation of the application.

4. The screen shot display control apparatus according to claim 1, wherein the screen shot generation step generates the first screen shot at end of the application.

5. A screen shot display control method for, in a client apparatus for activating an application by using a file received from a server apparatus, displaying a screen shot, the screen shot display control method comprising:
 a file reception step of receiving a file required for execution of the application, from the server apparatus;
 a screen shot generation step of generating a first screen shot by using the file received at the file reception step;
 a screen shot storing step of storing the first screen shot generated at the screen shot generation step;
 a screen shot reception step of, after the file is updated in the server apparatus, receiving a second screen shot generated by the server apparatus by using the file after the update, from the server apparatus, the second screen shot being a display image that is to be displayed on the display screen only during the period from the start of the activation of the application to the completion of the activation of the application; and
 a display selection step of (i) displaying the received second screen shot on the display screen only during the period from the start of the activation of the application to the completion of the activation of the application when the second screen shot is received from the server apparatus at the screen shot reception step, (ii) displaying the first screen shot stored at the screen shot storing step on the display screen only during the period from the start of the activation of the application to the completion of the activation of the application when the second screen shot is not received from the server apparatus at the screen shot reception step, and (iii) displaying display data generated by the application on the display screen after the period from the start of the activation of the application to the completion of the activation of the application.

6. A screen shot display control method for, in a client apparatus for activating an application by using a file received from a server apparatus, displaying a screen shot, the screen shot display control method comprising:
 a file reception step of receiving a file required for execution of the application, from the server apparatus;
 a screen shot generation step of generating a first screen shot by using the file received at the file reception step, the first screen shot being a display image that is to be displayed on a display screen only during a period from a start of an activation of the application to a completion of the activation of the activation;
 a screen shot storing step of storing the first screen shot generated at the screen shot generation step;
 a screen shot reception step of receiving, from the server apparatus, difference data indicating a difference between a screen shot generated by using the file before update and a screen shot generated by using the file after the update; and
 a display selection step of (i) displaying a second screen shot obtained by combining the received difference data and the first screen shot stored at the screen shot storing step on the display screen only during the period from the start of the activation of the application to the completion of the activation of the application when the screen shot reception step receives the difference data from the server apparatus at the screen shot reception step, the second screen shot being a display image that is to be displayed on the display screen only during the period from the start of the activation of the application to the completion of the activation of the application, (ii) displaying the first screen shot stored at the screen shot storing step on the display screen only during the period from the start of the activation of the application to the completion of the activation of the application when the screen shot reception step does not receive the difference data from the server apparatus at the screen shot reception step, and (iii) displaying display data generated by the application on the display screen after the period from the start of the activation of the application to the completion of the activation of the application.

7. An integrated circuit for, in a client apparatus for activating an application by using a file received from a server apparatus, displaying a screen shot, the integrated circuit comprising:
   a processor; and
   a non-transitory memory having stored thereon executable instructions, which when executed by the processor, cause the screen shot display apparatus to perform:
   a file reception step of receiving a file required for execution of the application, from the server apparatus;
   a screen shot generation step of generating a first screen shot by using the file received at the file reception step, the first screen shot being a display image that is to be displayed on a display screen only during a period from a start of an activation of the application to a completion of the activation of the application;
   a screen shot storing step of storing the first screen shot generated at the screen shot generation step;
   a screen shot reception step of, after the file is updated in the server apparatus, receiving a second screen shot generated by the server apparatus by using the file after the update, from the server apparatus, the second screen shot being a display image that is to be displayed on the display screen only during the period from the start of the activation of the application to the completion of the activation of the application; and
   a display selection step of (i) displaying the received second screen shot on the display screen only during the period from the start of the activation of the application to the completion of the activation of the application when the second screen shot is received from the server apparatus at the screen shot reception step, (ii) displaying the first screen shot stored at the screen shot storing step on the display screen only during the period from the start of the activation of the application to the completion of the activation of the application when the second screen shot is not received from the server apparatus at the screen shot reception step, and (iii) displaying display data generated by the application on the display screen after the period from the start of the activation of the application to the completion of the activation of the application.

8. An integrated circuit for, in a client apparatus for activating an application by using a file received from a server apparatus, displaying a screen shot, the integrated circuit comprising:
   a processor; and
   a non-transitory memory having stored thereon executable instructions, which when executed by the processor, cause the screen shot display apparatus to perform:
   a file reception step of receiving a file required for execution of the application, from the server apparatus;
   a screen shot generation step of generating a first screen shot by using the file received at the file reception step, the first screen shot being a display image that is to be displayed on a display screen only during a period from a start of an activation of the application to a completion of the activation of the application;
   a screen shot storing step of storing the first screen shot generated at the screen shot generation step;
   a screen shot reception step of receiving, from the server apparatus, difference data indicating a difference between a screen shot generated by using the file before update and a screen shot generated by using the file after the update; and
   a display selection step of (i) displaying a second screen shot obtained by combining the received difference data and the first screen shot stored at the screen shot storing step on the display screen only during the period from the start of the activation of the application to the completion of the activation of the application when the screen shot reception step receives the difference data from the server apparatus at the screen shot reception step, the second screen shot being a display image that is to be displayed on the display screen only during the period from the start of the activation of the application to the completion of the activation of the application, (ii) displaying the first screen shot stored at the screen shot storing step on the display screen only during the period from the start of the activation of the application to the completion of the activation of the application when the screen shot reception step does not receive the difference data from the server apparatus at the screen shot reception step, and (iii) displaying display data generated by the application on the display screen after the period from the start of the activation of the application to the completion of the activation of the application.

9. The screen shot display control apparatus according to claim 2, wherein the screen shot generation step generates the first screen shot at the completion of the activation of the application.

10. The screen shot display control apparatus according to claim 2, wherein the screen shot generation step generates the first screen shot at end of the application.

* * * * *